B. J. HINKEBEIN.
BRAKE MECHANISM.
APPLICATION FILED APR. 19, 1909.
935,152.
Patented Sept. 28, 1909.
2 SHEETS—SHEET 1.
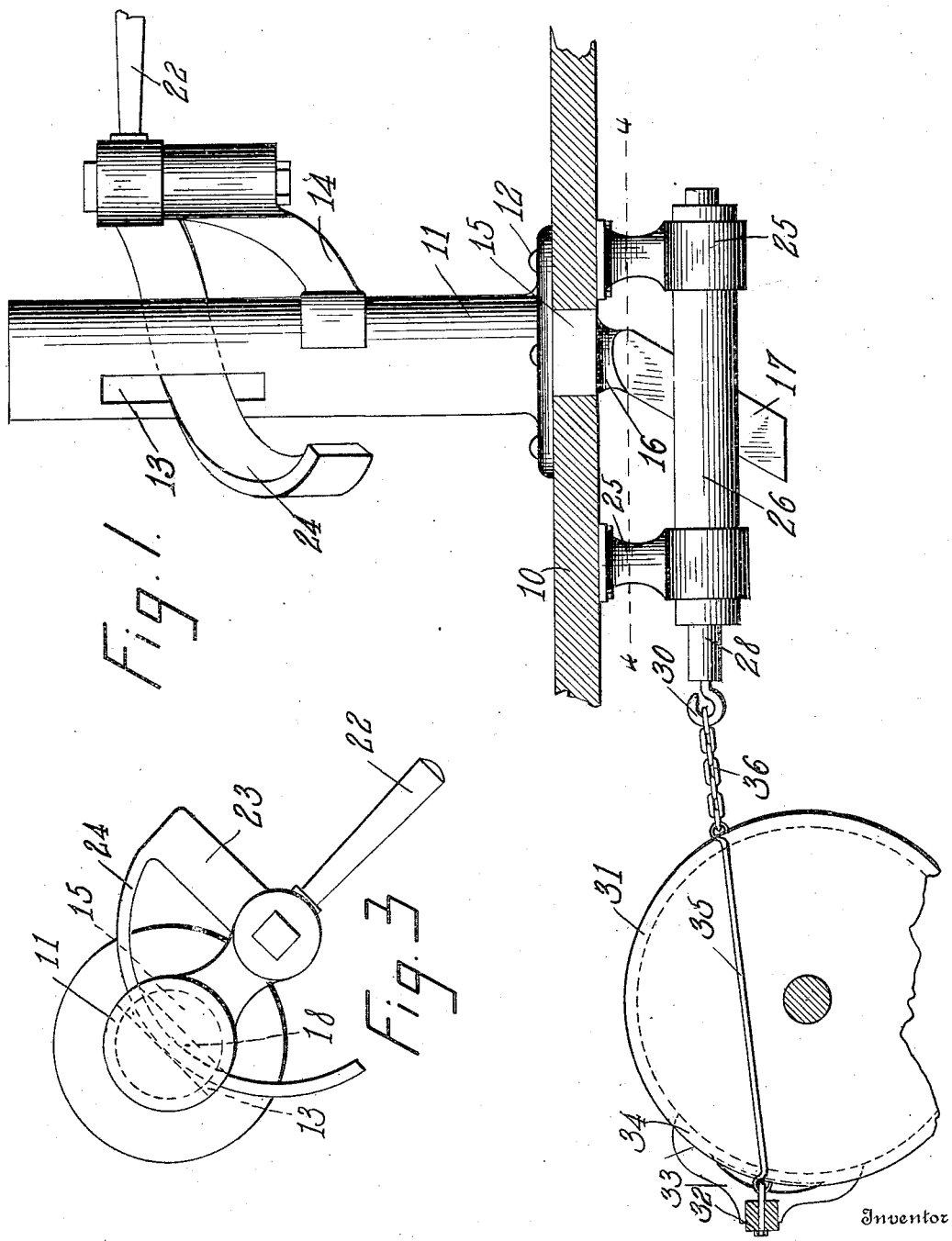
Inventor
Bernard J. Hinkebein B. J. HINKEBEIN.
BRAKE MECHANISM.
APPLICATION FILED APR. 19, 1909.
935,152.
Patented Sept. 28, 1909.
2 SHEETS—SHEET 2.
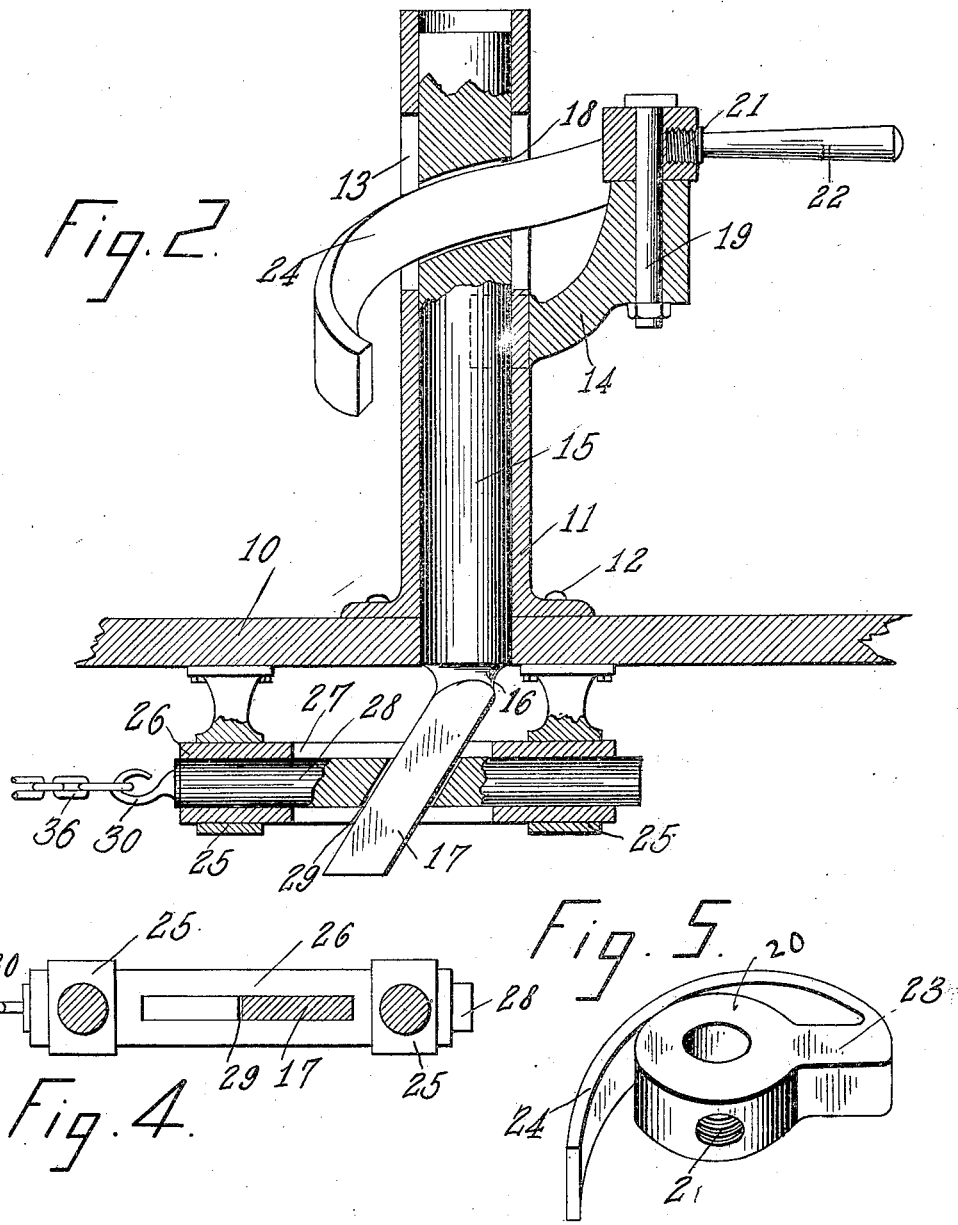
Witnesses
C. R. Hardy
Inventor
Bernard J. Hinkebein
By
Attorney

UNITED STATES PATENT OFFICE.

BERNARD J. HINKEBEIN, OF NEW ALBANY, INDIANA.

BRAKE MECHANISM.

935,152.  Specification of Letters Patent.  Patented Sept. 28, 1909.

Application filed April 19, 1909. Serial No. 490,856.

*To all whom it may concern:*

Be it known that I, BERNARD J. HINKEBEIN, a citizen of the United States, residing at New Albany, in the county of Floyd, State of Indiana, have invented certain new and useful Improvements in Brake Mechanism; and I do hereby declare the following to be a full, clear, and exact description of the invention, such as will enable others skilled in the art to which it appertains to make and use the same.

This invention relates to vehicle brakes and has special reference to a brake adapted to be used in combination with railroad and street cars.

One object of the invention is to provide a novel means whereby the brakes may be rapidly and positively set.

Another object of the invention is to provide a simple and efficient mechanism which will do away with the winding of brake chains around drums and brake staffs and the like.

With the above and other objects in view the invention consists in general of a cam actuated plunger provided with a cam at the lower end which in turn actuates another plunger to set or release a brake.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a side elevation partly diagrammatic showing this invention as applied to a car brake. Fig. 2 is a vertical sectional view through the operating mechanism. Fig. 3 is a top plan view of the operating mechanism. Fig. 4 is a detail section on the line 4—4 of Fig. 1. Fig. 5 is a perspective view of the form of cam used in this invention.

The numeral 10 indicates the floor of a car and upon this floor is mounted a hollow standard 11 being secured to the floor by means of suitable screws 12. This hollow standard is provided with a pair of oppositely disposed slots 13 and upon the standard is mounted a bracket 14. Within the standard 11 is positioned a plunger 15 provided with a reduced end 16 having a rectangular bar 17 fixed thereon at an obtuse angle thereto. This plunger 15 is provided with a slot 18 which extends therethrough and this slot is preferably of spiral form. The bracket 14 is perforated vertically and extending therethrough is a pivot bolt 19 upon the upper end whereof is mounted a cam which comprises a hollow body 20 provided with a suitable threaded aperture 21 to receive an operating handle 22 and an arm 23 extending laterally therefrom. From the arm 23 extends a spiral cam 24 which passes through the slots 13 in the member 11 and the slot 18 in the plunger 15.

It will now be plain from an inspection of Fig. 1 that as the handle 22 is moved to the right or left the spiral cam will be drawn through the slot 18 and will cause the plunger 15 to be raised or lowered according to the direction in which the handle moves.

Supported in suitable brackets 25 below the floor of the car is a cylindrical casing 26 provided with opposed slots 27 and a plunger 28 provided with an angled slot 29 is held to move longitudinally of this casing. The plunger 28 furthermore is provided at one end with a chain engaging hook 30. The diagonal bar 17 passes through the slots 27 and 29 and as the plunger 15 is raised or lowered the plunger 28 will be caused to move forward or back in the casing 26.

At 31 is indicated one of the wheels of a car and at 32 is shown a brake beam whereon are mounted the usual brake heads 33 supporting the shoes 34. Connected to the brake beam by means of a suitable rod 35 is a chain 36 having its free end engaged with the hook 30.

Considering now the operation of the device if it be desired to set the brakes it is merely necessary to rotate the handle 22 in such direction that the plunger 15 will be depressed. This will force down the member 17 and will cause the plunger 28 to move away from the wheel 31 and will draw the brake 34 in contact therewith. When it is desired to release the brake a movement of the handle 22 in the direction opposite to that just described will cause the plunger 28 to move in the opposite direction and slacken the chain 36.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a brake mechanism, a plunger supported for longitudinal movement, a handled cam arranged to move said plunger, a second plunger supported for longitudinal movement, a cam bar carried by the first mentioned plunger to move the second plunger, a brake, and an operative connection between the last mentioned plunger and the brake.

2. In a brake mechanism, a plunger supported for longitudinal movement and provided with a slot therethrough, a handled cam arranged to move said plunger comprising a spiral bar passing through the slot in the plunger, a second plunger supported for longitudinal movement, a cam bar carried by the first mentioned plunger to move the second plunger, a brake, and an operative connection between the last mentioned plunger and the brake.

3. In a brake mechanism, a plunger supported for longitudinal movement and provided with a slot therethrough, a casing surrounding said plunger and provided with opposed slots therethrough, a bracket supported on said casing, a handled cam comprising a spirally formed bar supported for rotation on said bracket and arranged to move said plunger, said bar passing through the slots in the plunger and casing, a second plunger supported for longitudinal movement, a cam bar carried by the first mentioned plunger to move the second plunger, a brake, and an operative connection between the last mentioned plunger and the brake.

4. In a brake mechanism, a plunger supported for longitudinal movement in a vertical direction, a handled cam arranged to move said plunger, a second plunger supported for longitudinal movement in a horizontal direction, a cam bar carried by the first mentioned plunger to move the second plunger, a brake, and an operative connection between the last mentioned plunger and the brake.

In testimony whereof, I affix my signature, in presence of two witnesses.

BERNARD J. HINKEBEIN.

Witnesses:
 EVAN B. STOTSENBURG,
 JNO. H. WEATHERS.